(12) United States Patent
Park et al.

(10) Patent No.: US 11,342,621 B2
(45) Date of Patent: May 24, 2022

(54) BATTERY PACK

(71) Applicant: LG CHEM, LTD., Seoul (KR)

(72) Inventors: Jin-Yong Park, Daejeon (KR);
Sang-Woo Ryu, Daejeon (KR);
Jeong-O Mun, Daejeon (KR);
Jung-Hoon Lee, Daejeon (KR);
Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 128 days.

(21) Appl. No.: 16/341,359

(22) PCT Filed: Jan. 5, 2018

(86) PCT No.: PCT/KR2018/000276
§ 371 (c)(1),
(2) Date: Apr. 11, 2019

(87) PCT Pub. No.: WO2018/236018
PCT Pub. Date: Dec. 27, 2018

(65) Prior Publication Data
US 2020/0044213 A1    Feb. 6, 2020

(30) Foreign Application Priority Data
Jun. 22, 2017   (KR) .................. 10-2017-0079275

(51) Int. Cl.
*H01M 50/20*    (2021.01)
*H01M 50/204*   (2021.01)
(Continued)

(52) U.S. Cl.
CPC ......... *H01M 50/20* (2021.01); *H01M 50/204* (2021.01); *B60K 6/28* (2013.01);
(Continued)

(58) Field of Classification Search
CPC ... H01M 50/20; H01M 2220/20; B60L 50/64; B60K 6/28; B60Y 2200/91; B60Y 2200/92; B60Y 2400/112
See application file for complete search history.

(56) References Cited

U.S. PATENT DOCUMENTS

2006/0240318 A1* 10/2006 Kim .................. H01M 10/6563
429/153
2007/0026305 A1   2/2007 Jeon et al.
(Continued)

FOREIGN PATENT DOCUMENTS

CN        101212032 A      7/2008
CN        103358874 A  *  10/2013
(Continued)

OTHER PUBLICATIONS

EPO machine generated English translation of CN-103358874-A (Year: 2013).*
(Continued)

*Primary Examiner* — Christopher P Domone
*Assistant Examiner* — Kimberly Wyluda
(74) *Attorney, Agent, or Firm* — Birch, Stewart, Kolasch & Birch, LLP (57) ABSTRACT

A battery pack includes a battery module having a plurality of battery cells; a lower plate on which the plurality of battery modules are placed; a support member coupled to the lower plate to support the battery module; and a mounting
(Continued)

nut coupled to the lower plate and coupled to the support member so that the battery module is fastened by means of a bolt, wherein the battery module is in contact with the support member.

12 Claims, 9 Drawing Sheets

(51) Int. Cl.
  *B60L 50/64* (2019.01)
  *B60K 6/28* (2007.10)
(52) U.S. Cl.
  CPC ........... *B60L 50/64* (2019.02); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | | | |
|---|---|---|---|---|
| 2007/0037051 | A1* | 2/2007 | Kim | H01M 10/625 |
| | | | | 429/151 |
| 2008/0160395 | A1 | 7/2008 | Okada et al. | |
| 2012/0301765 | A1 | 11/2012 | Loo et al. | |
| 2012/0312614 | A1 | 12/2012 | Fujiwara et al. | |
| 2013/0241498 | A1 | 9/2013 | Koebler | |
| 2017/0125774 | A1 | 5/2017 | Choi et al. | |
| 2017/0244072 | A1* | 8/2017 | Robert | H01M 10/6554 |
| 2020/0028201 | A1* | 1/2020 | Ahn | H01M 50/20 |

FOREIGN PATENT DOCUMENTS

| | | |
|---|---|---|
| CN | 103477528 A | 12/2013 |
| CN | 106025132 A | 10/2016 |
| CN | 106133948 A | 11/2016 |
| CN | 205863246 U | 1/2017 |
| EP | 2 766 045 A1 | 8/2014 |
| JP | 7-1972 A | 1/1995 |
| JP | 9-104241 A | 4/1997 |
| JP | 9-118139 A | 5/1997 |
| JP | 2012-84239 A | 4/2012 |
| JP | 2012-160370 A | 8/2012 |
| JP | 2016-18729 A | 2/2016 |
| JP | 2016-178085 A | 10/2016 |
| JP | 2017-79138 A | 4/2017 |
| KR | 10-2012-0112584 A | 10/2012 |
| KR | 10-2016-0005894 A | 1/2016 |

OTHER PUBLICATIONS

Definition of Beam (Dictionary.com) (Year: 2016).*
International Search Report for PCT/KR2018/000276 dated Jun. 26, 2018.

* cited by examiner

FIG. 1

Prior Art

FIG. 2

Prior Art

FIG. 3

Prior Art

BATTERY PACK

TECHNICAL FIELD

The present application claims priority to Korean Patent Application No. 10-2017-0079275 filed on Jun. 22, 2017 in the Republic of Korea, the disclosures of which are incorporated herein by reference.

The present disclosure relates to a battery pack, and more particularly, to a battery pack capable of improving space efficiency in the battery pack.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator and an electrolyte interposed therebetween. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In general, a secondary battery has a module structure in which unit cells are stacked, and a plurality of modules may be stacked to form a battery pack. The battery pack may be used as an energy storage device and is designed to prevent the danger caused by external physical factors and satisfy the installation environment or conditions. In addition, a support beam, a bolt and a mounting nut may be used to mount the battery module in the battery pack.

Figure 1:
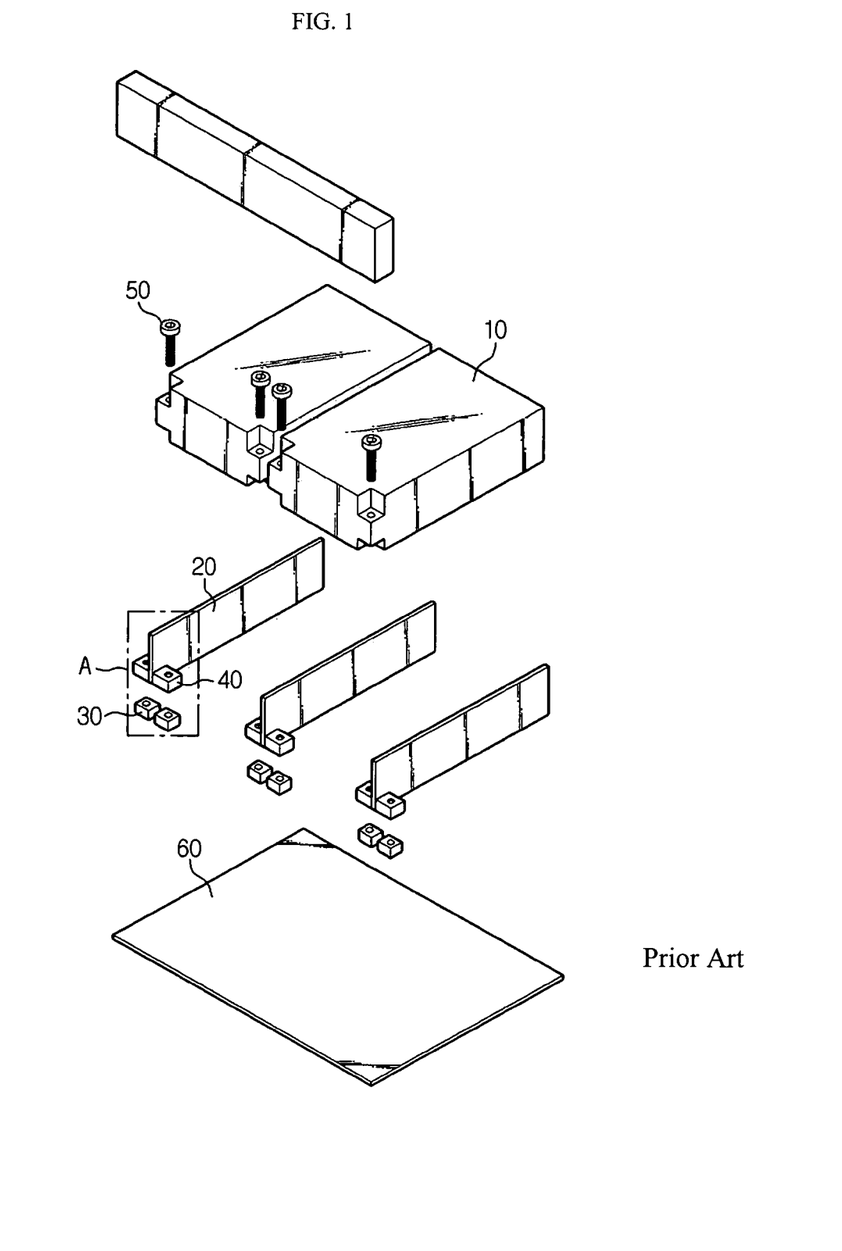
FIG. 1 is an exploded perspective view schematically showing an inside of a conventional battery pack.
Figure 2:
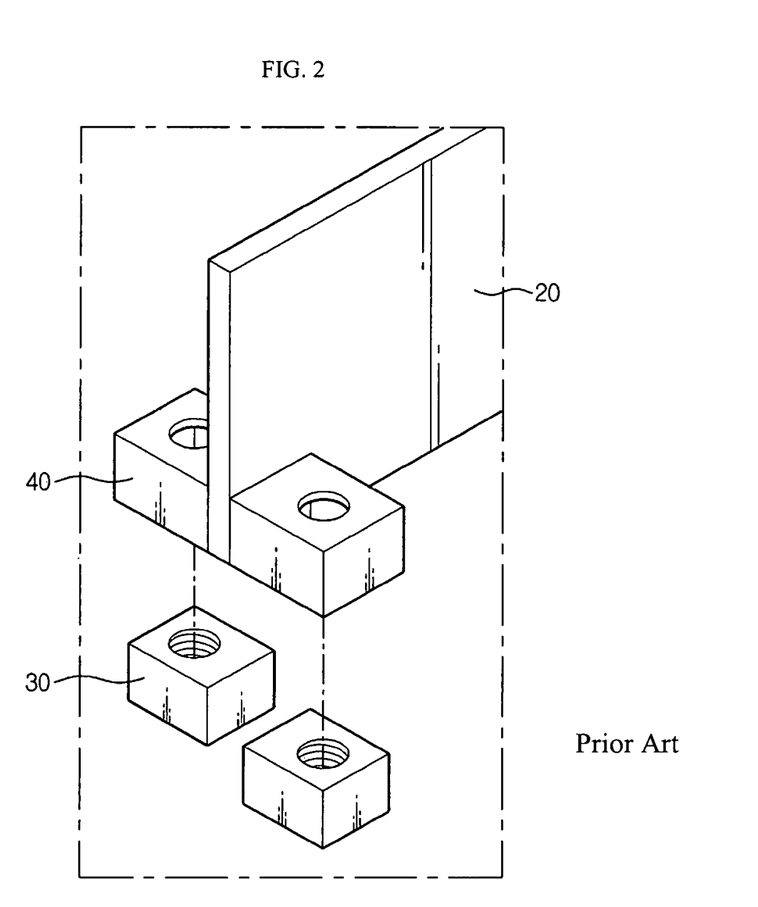
FIG. 2 is an enlarged view showing a portion A of FIG. 1.
Figure 3:
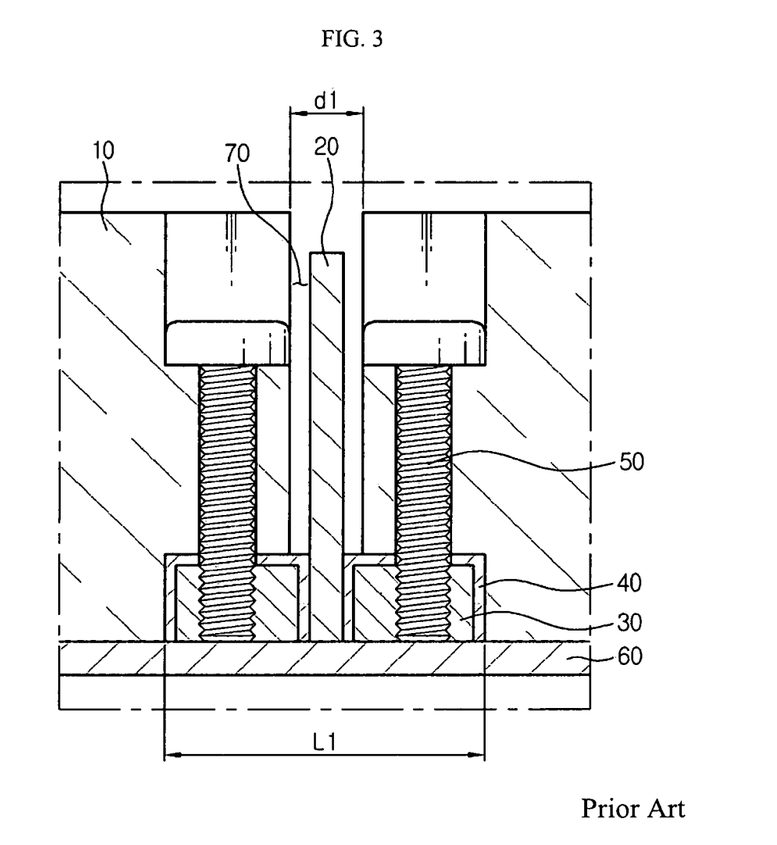
FIG. 3 is a cross-sectioned view showing the battery module assembled using a support beam, a beam flange, a bolt and a mounting nut.

FIG. 1 is an exploded perspective view schematically showing an inside of a conventional battery pack, FIG. 2 is an enlarged view showing a portion A of FIG. 1, and FIG. 3 is a cross-sectioned view showing the battery module assembled using a support beam, a beam flange, a bolt and a mounting nut.

Referring to FIGS. 1 to 3, a mounting nut 30 is coupled to a beam flange 40 coupled to a support beam 20 and is welded thereto, and then the mounting nut 30 is coupled to a lower plate 60. As the mounting nut 30 is coupled to a bolt 50, a battery module 10 is coupled to the beam flange 40 and the lower plate 60.

However, in the conventional technique, the support beam 20 is interposed and coupled between two mounting nuts 30, and thus, when the battery module 10 is coupled to the beam flange 40, a space 70 (see FIG. 3) is formed between the battery module 10 and the support beam 20. Due to the space 70 between the battery module 10 and the support beam 20, the space efficiency in the battery pack deteriorates, thereby increasing the volume of the battery pack.

DISCLOSURE

Technical Problem

The present disclosure is directed to providing a battery pack, which may improve space efficiency in the battery pack by removing a space between a battery module and a support member.

Also, the present disclosure is directed to providing a battery pack, which may improve rigidity of the support member.

In addition, the present disclosure is directed to providing a battery pack, which may improve the coupling strength between the battery module and the support member.

Technical Solution

In one aspect of the present disclosure, there is provided a battery pack, comprising: a battery module having a plurality of battery cells; a lower plate on which the plurality of battery modules are placed; a support member coupled to the lower plate to support the battery module; a mounting nut coupled to the lower plate and coupled to the support member and at least one bolt securing the battery module to the mounting nut, wherein the battery module is in contact with the support member.

Also, a side surface of the battery module may be in contact with a side surface of the support member.

In addition, the mounting nut may be coupled to an edge portion of the support member in an upper and lower direction.

Also, the mounting nut may have a height lower than a height of the support member.

In addition, the mounting nut may have an integrated form, and the integrated mounting nut may have at least two bolt coupling holes.

Also, the support member may have an uneven portion based on a cross section in an upper and lower direction.

In addition, the uneven portion may be formed so that a first protrusion and a first groove having a '[' shape are on opposite sides of the support member.

Also, the battery module may have a second protrusion or a second groove formed to correspond to the uneven portion.

In addition, the support member may include a first support beam disposed between a first battery module among the plurality of battery modules and a second battery module adjacent to the first battery module and coupled to the mounting nut; and a second support beam disposed to intersect the first support beam and coupled to the mounting nut.

Meanwhile, in another aspect of the present disclosure, there is also provided a vehicle, comprising the battery pack.

Advantageous Effects

According to the embodiments of the present disclosure, the space between a battery module and a support member is removed, and thus it is possible to improve the space efficiency in the battery pack.

Also, an uneven portion is formed at the support member, and thus it is possible to improve the rigidity of the support member.

In addition, a protrusion and a groove are formed at the battery module to correspond to the uneven portion of the support member, and thus it is possible to improve the coupling strength between the battery module and the support member.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 4:
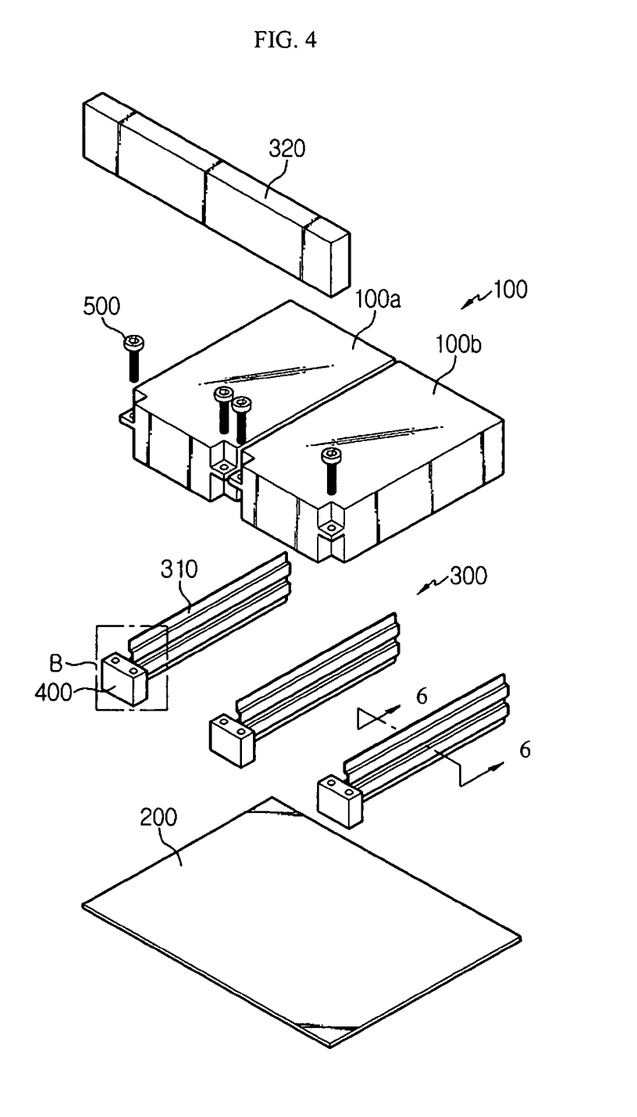
FIG. 4 is an exploded perspective view schematically showing an inside of a battery pack according to the first embodiment of the present disclosure.
Figure 5:
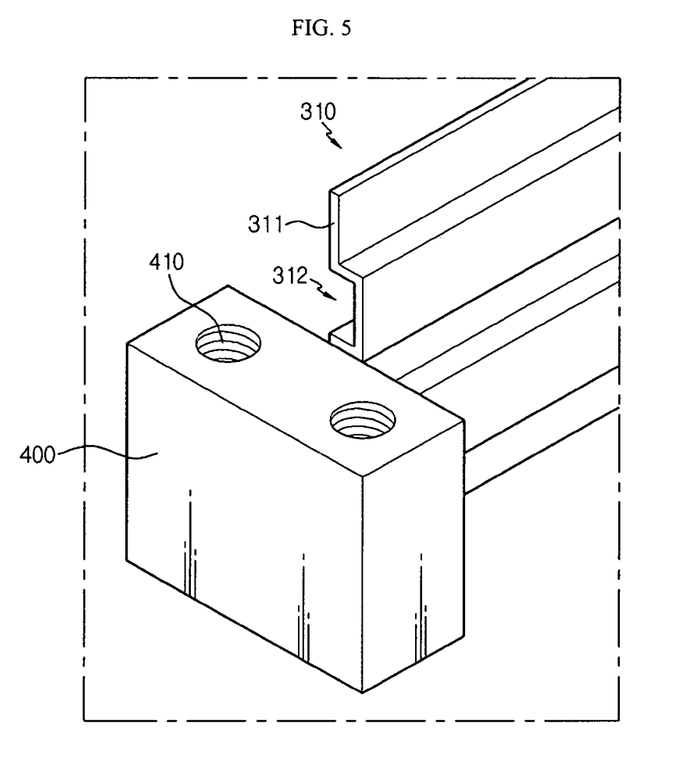
FIG. 5 is an enlarged view showing a portion B of FIG. 4.
Figure 6:
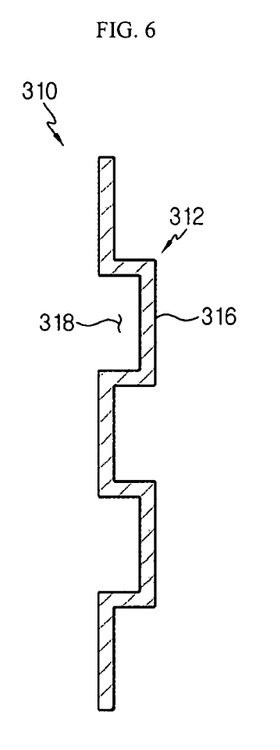
FIG. 6 is a cross-sectioned view showing a first support beam, taken along the line 6-6 of FIG. 4.
Figure 7:
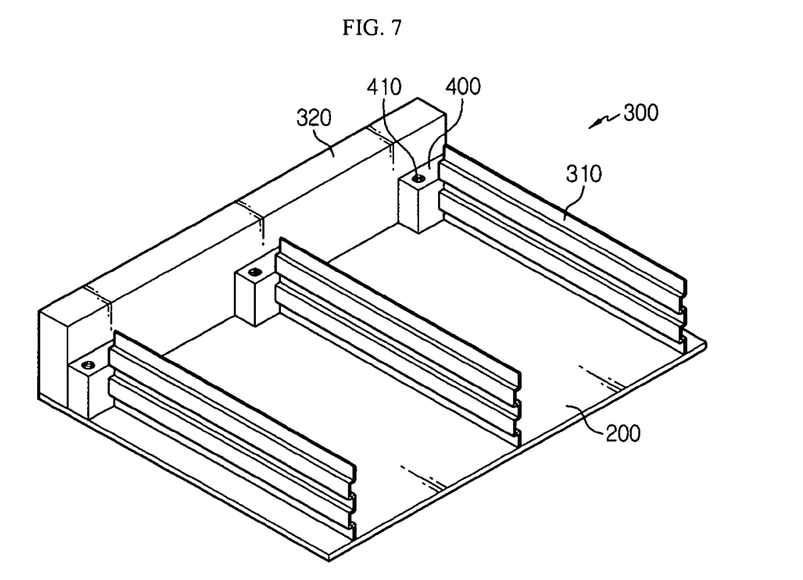
FIG. 7 is a schematic perspective view showing that the first support beam is coupled to a second support beam by means of a mounting nut in the battery pack according to the first embodiment of the present disclosure.
Figure 8:
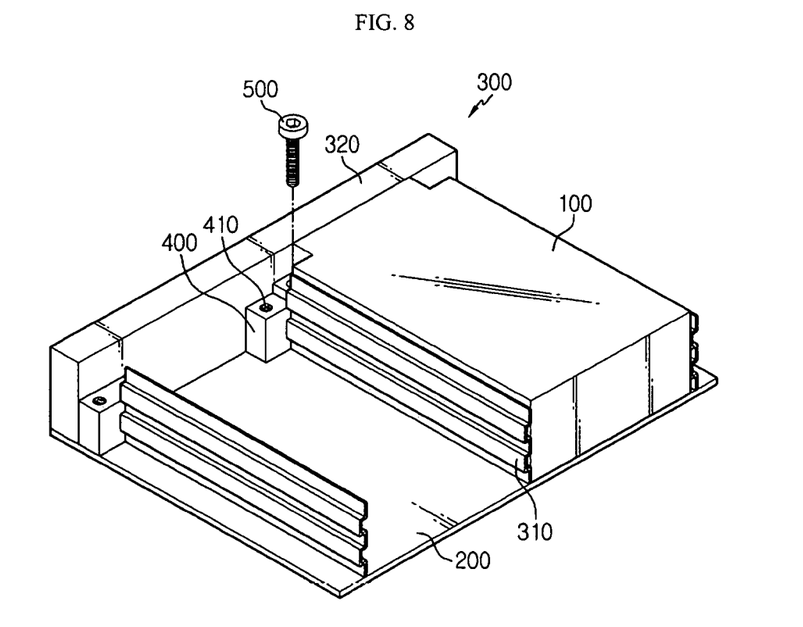
FIG. 8 is a schematic perspective view showing that the battery module is coupled to the support member in the battery pack according to the first embodiment of the present disclosure.
Figure 9:
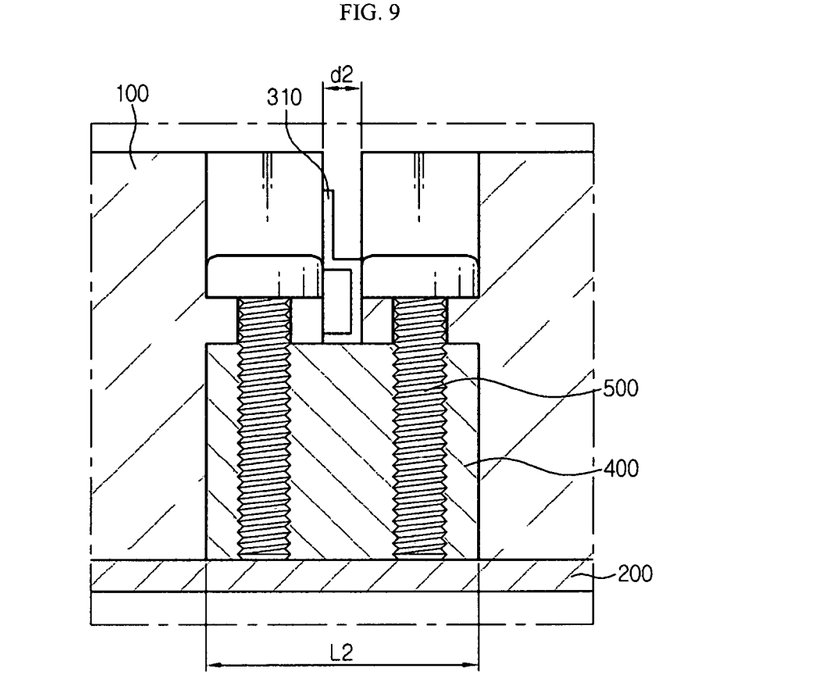
FIG. 9 is a cross-sectioned view showing that the battery module is coupled by means of a support member, a bolt and a mounting nut in the battery pack according to the first embodiment of the present disclosure.

FIG. 4 is an exploded perspective view schematically showing an inside of a battery pack according to the first embodiment of the present disclosure, FIG. 5 is an enlarged view showing a portion B of FIG. 4, FIG. 6 is a cross-sectioned view showing a first support beam, taken along the line 6-6 of FIG. 4, FIG. 7 is a schematic perspective view showing that the first support beam is coupled to a second support beam by means of a mounting nut in the battery pack according to the first embodiment of the present disclosure, FIG. 8 is a schematic perspective view showing that the battery module is coupled to the support member in the battery pack according to the first embodiment of the present disclosure, and FIG. 9 is a cross-sectioned view showing that the battery module is coupled by means of a support member, a bolt and a mounting nut in the battery pack according to the first embodiment of the present disclosure.

Referring to FIGS. 4 to 9, a battery pack according to the first embodiment of the present disclosure includes a battery module 100, a lower plate 200, a support member 300 and a mounting nut 400. The battery pack includes a plurality of battery modules 100 stacked or arranged therein, and a case, not shown, may be provided to accommodate and protect the plurality of battery modules 100. The case may accommodate one or a plurality of battery modules 100. That is, one or more battery modules 100 are stacked or arranged in the case, and the case encloses and protects the battery modules 100. In other words, the case encloses all the battery modules 100, thereby protecting the battery module 100 from external vibration or shock. The case may have a shape corresponding to the shape of the battery module 100. For example, if the entire shape of the stacked battery modules 100 has a hexahedron shape, the case may have a hexahedron shape to correspond to the case. For example, the case may be manufactured by bending a metal plate, and accordingly the case may be made in an integrated form. Here, if the case is manufactured as an integrated form, a coupling process may be simplified and easier. Alternatively, the case may be manufactured in a separable form and be coupled using various methods such as welding, riveting, bolting, pin coupling, bracketing or moment bonding. In addition, the battery pack may include various devices for controlling charge/discharge of the battery module 100, for example a BMS, a current sensor, a fuse, and the like.

The battery module 100 may include a plurality of battery cells. The battery cell may be configured so that a plurality of unit cells respectively having a positive electrode plate, a separator and a negative electrode plate arranged in order or a plurality of bi-cells respectively having a positive electrode plate, a separator, a negative electrode plate, a separator, a positive electrode plate, a separator and a negative electrode plate arranged in order are stacked to correspond to a battery capacity. In addition, electrode leads may be provided in the battery cell. The electrode leads are a type of terminals that are exposed to the outside and connected to an external device, and the electrode leads may be made of a conductive material. The electrode leads may include a positive electrode lead and a negative electrode lead. The positive electrode lead and the negative electrode lead may be disposed in opposite directions with respect to the longitudinal direction of the battery cell, or the positive electrode lead and the negative electrode lead may be positioned in the same direction with respect to the longitudinal direction of the battery cell. Meanwhile, the battery module 100 may include a plurality of cartridges for accommodating the battery cells. Each cartridge may be manufactured by injection-molding plastic, and the plurality of cartridges respectively having an accommodating portion capable of accommodating the battery cell may be stacked. A cartridge assembly prepared by stacking the plurality of cartridges may include a connector element or a terminal element. For example, the connector element may include various types of electrical connecting parts or members for connecting to a battery management system (BMS) (not shown) capable of providing data on the voltage or temperature of the battery cell. In addition, the terminal element includes a positive electrode terminal and a negative electrode terminal as main terminals connected to the battery cell, and the terminal element may have a terminal bolt to be electrically connected to the outside.

Referring to FIG. 8, the battery module 100 may be provided so that a side surface of the battery module 100 is in contact with a side surface of the support member 300. That is, the battery module 100 may be in contact with the fixed support member 300 and be supported by the support member 300, and also be fixed to the lower plate 200 by means of a bolt 500 and a mounting nut 400.

The plurality of battery modules 100 are placed on the lower plate 200, and the support member 300 and the mounting nut 400 are coupled to the lower plate 200. That is, as the support member 300 is coupled to the mounting nut 400 by welding or the like, the support member 300 is also coupled to the lower plate 200 by welding or the like, and the battery module 100 is disposed in contact with the support member 300 and fixed by means of the bolt 500 and the mounting nut 400. However, the coupling method of the support member 300, the mounting nut 400 and the lower plate 200 is not limited to welding. The lower plate 200 may be coupled to the case, or the lower plate 200 may configure a part of the case.

The support member 300 is coupled to the lower plate 200 and supports the battery module 100. The support member 300 may include a first support beam 310 and a second support beam 320. Referring to FIGS. 4 and 8, the first support beam 310 may be disposed between a first battery module 100a among the plurality of battery modules 100 and a second battery module 100b adjacent to the first battery module 100a. That is, the first support beam 310 may be interposed between the first battery module 100a and the second battery module 100b. In addition, one side surface of the first battery module 100a is in contact with one side surface of the first support beam 310, and one side surface of the second battery module 100b is in contact with the other side of the first support beam 310. Here, referring to FIGS. 4 and 7, since the first support beam 310 is coupled and fixed to the mounting nut 400 by welding or the like, if the first battery module 100a and the second battery module 100b are coupled to the first support beam 310, the first support beam 310 is capable of supporting the first battery module 100a second battery module 100b. In the conventional art, referring to FIGS. 1 to 3, the support beam 20 is interposed between two mounting nuts 30. However, the first support beam 310 of the support member 300 included in the battery pack according to the first embodiment of the present disclosure is coupled to the side surface of the mounting nut 400. This will be described in detail later in relation to in the mounting nut 400. Referring to FIG. 7, the second support beam 320 is disposed to intersect the first support beam 310, for example, in a direction perpendicular to the first support beam 310, and is coupled to the mounting nut 400 to support the mounting nut 400.

Referring to FIG. 6, the first support beam 310 of the support member 300 may have an uneven portion 312 based on a cross section thereof in an upper and lower direction. If the uneven portion 312 is formed at the first support beam 310, the rigidity is increased so that the battery module 100 may be supported and fixed more firmly. In addition, the uneven portion 312 may be formed in various shapes, and, for example, may be formed in a shape where a first protrusion 316 and a first groove 318 having a '[' shape are extended to orient opposite directions alternately. However, the uneven portion 312 is not limited to the '[' shape but may have various shapes such as a circular, ellipse or curved shape.

The mounting nut 400 is coupled to the lower plate 200, and the support member 300 is coupled to the side surface of the mounting nut 400. In addition, if the battery module 100 is disposed in contact with the first support beam 310 of the support member 300, the bolt 500 and the mounting nut 400 fasten the battery module 100 to fix the battery module 100 (see FIG. 8).

The mounting nut 400 may be coupled to an edge portion 311 of the first support beam 310 of the support member 300 in the upper and lower direction (see FIG. 5). That is, for example, one side of the mounting nut 400 may be coupled to the second support beam 320 by welding or the like, and the edge portion 311 of the first support beam 310 may be coupled to the other side of the mounting nut 400 by welding or the like (see FIG. 7). Here, the mounting nut 400 may have two or more bolt coupling holes 410 into which the bolt 500 may be coupled. In addition, the mounting nut 400 may have an integrated form. If the mounting nut 400 has an integrated form as above, the overall length of the mounting nut 400 is relatively reduced and the battery module 100 may be in close contact with the first support beam 310, as compared with the conventional structure where the mounting nut 30 is separated. Thus, the space between the battery module 100 and the support member 300 is removed, thereby improving the space efficiency inside the battery pack. That is, referring to FIG. 3, in the conventional art, since two mounting nuts 30 are separated from each other and the support beam 20 is interposed between two mounting nuts 30, a space 70 is formed between the battery module 10 and the support beam 20, and thus a gap as much as d1 is generated between two mounting nuts 30 having a length of L1. In addition, in the battery pack according to the first embodiment of the present disclosure, referring to FIG. 9, since the battery module 100 and the first support beam 310 are in contact with each other, no space is formed between the battery module 100 and the first support beam 310. Also, a gap as much as d2 is generated between the battery modules 100, and the mounting nut 400 has a length of L2. Here, since d2 is smaller than d1 and L2 is also smaller than L1, a surplus space inside the battery pack is removed. Thus, in the battery pack according to the first embodiment of the present disclosure, the space efficiency may be improved, compared to the conventional battery pack.

Since the first support beam 310 is coupled and fixed to the mounting nut 400 by welding or the like and the first support beam 310 is supported by the mounting nut 400, it is necessary to have a sufficient contact area between the mounting nut 400 and the first support beam 310 so that the mounting nut 400 may support the first support beam 310. For this, the mounting nut 400 is provided to have a height higher than the mounting nut 30 of the conventional art. However, the height of the mounting nut 400 is lower than the height of the support member 300, particularly the first support beam 310, so that the battery module 100 is coupled in contact with the mounting nut 400. However, the present invention is not limited thereto, and the height of the mounting nut 400 may be set to be equal to or smaller than the height of the mounting nut 30 of the conventional art.

Hereinafter, the operations and effects of the battery pack according to the first disclosure of the present disclosure will be described.

Referring to FIGS. 4 to 9, for example, the mounting nut 400 integrally formed and having two bolt coupling holes 410 is fixed to the lower plate 200 by welding or the like, and the first support beam 310 and the second support beam 320 are disposed to intersect with each other and respectively coupled to the mounting nut 400. Here, the mounting nut 400 may be coupled to the edge portions 311 of the first support beam 310 in the upper and lower direction.

The first battery module 100a and the second battery module 100b are in contact with the first support beam 310 and the mounting nut 400, respectively, and the bolt 500 fastens and fixes the battery modules 100 through the bolt coupling hole 410 of the mounting nut 400.

Since the mounting nut 400 is integrally formed and the battery modules 100a, 100b are in close contact with the first support beam 310, the space between the battery modules 100 and the first support beam 310 is removed, thereby improving the space efficiency inside the battery pack. However, the coupling order of the above components is not limited to the above method and may be modified in various ways.

Figure 10:
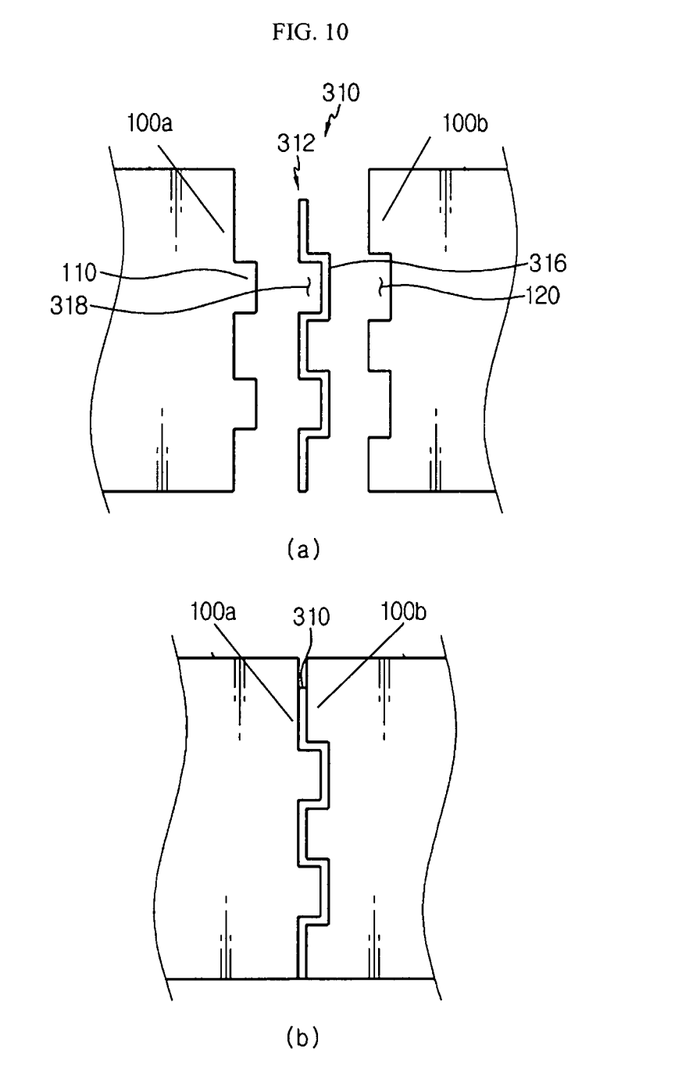
FIG. 10(a) is a cross-sectioned view schematically showing a state before the battery module is coupled to the support member in the battery pack according to the second embodiment of the present disclosure.
FIG. 10(b) is a cross-sectioned view schematically showing a state after the battery module is coupled to the support member in the battery pack according to the second embodiment of the present disclosure.

FIG. 10(a) is a cross-sectioned view schematically showing a state before the battery module is coupled to the support member in the battery pack according to the second embodiment of the present disclosure, and FIG. 10(b) is a cross-sectioned view schematically showing a state after the battery module is coupled to the support member in the battery pack according to the second embodiment of the present disclosure.

Hereinafter, the operation and effect of a battery module according to the second embodiment of the present disclosure will be described with reference to the accompanying drawings, but any feature identical to that of the battery module according to the first embodiment of the present disclosure will not be described in detail here.

In the second embodiment of the present disclosure, a second protrusion 110 or a second groove 120 is formed at the battery module 100, different from the first embodiment.

Referring to FIGS. 10(a) and 10(b), the second protrusion 110 and the second groove 120 may be formed at the first battery module 100a and the second battery module 100b, respectively. The uneven portion 312 may be formed at the first support beam 310 to increase the rigidity of the first support beam 310, similar to the first embodiment. In addition, the second protrusion 110 formed at the first battery module 100a and the second groove 120 formed at the second battery module 100b are formed to correspond to the uneven portion 312 formed at the first support beam 310, namely the first groove 318 and the first protrusion 316. That is, the first protrusion 316 of the uneven portion 312 may be coupled to the second groove 120 of the second battery module 100b, and the first groove 318 of the uneven portion 312 may be coupled to the second protrusion 110 of the first battery module 100a. In this case, the first support beam 310 may have greater rigidity, and the coupling between the first battery module 100a or the second battery module 100b and the first support beam 310 is enhanced, thereby allowing the battery modules 100a, 100b to be supported by the first support beam 310 more strongly.

Meanwhile, a vehicle (not shown) according to an embodiment of the present disclosure may include the battery pack described above, and the battery pack may include the battery module 100. In addition, the battery pack according to the first or second embodiment of the present disclosure may be applied to the vehicle (not shown), for example a predetermined vehicle (not shown) using electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery pack, and, in particular, the present disclosure may be applied to industries associated with a secondary battery.

What is claimed is:
1. A battery pack, comprising:
a battery module having a plurality of battery cells;
a lower plate on which the battery module is placed;
a support member coupled to the lower plate to support the battery module;
a mounting nut directly coupled to the lower plate and coupled to the support member; and
at least one bolt securing the battery module to the mounting nut,
wherein the battery module is in contact with the support member,
wherein the battery module is provided in plurality,
wherein the plurality of battery modules are accommodated in a case,
wherein the support member includes:
a first support beam disposed between a first battery module among the plurality of battery modules and a second battery module adjacent to the first battery module and coupled to the mounting nut; and
a second support beam disposed to intersect the first support beam and coupled to the mounting nut, and
wherein the mounting nut is located between the first support beam and the second support beam.
2. The battery pack according to claim 1, wherein a side surface of the battery module is in contact with a side surface of the support member.
3. The battery pack according to claim 1, wherein the mounting nut is coupled to an edge portion of the support member in an upper and lower direction.
4. The battery pack according to claim 1, wherein the mounting nut has an integrated form, and the integrated mounting nut has at least two bolt coupling holes.
5. The battery pack according to claim 1, wherein the support member has an uneven portion based on a cross section in an upper and lower direction.
6. The battery pack according to claim 5, wherein the uneven portion is formed so that a first protrusion and a first groove having a ['shape are on opposite sides of the support member.

7. The battery pack according to claim 6, wherein the battery module has a second protrusion or a second groove formed to correspond to the uneven portion.

8. A vehicle, comprising a battery pack defined in claim 1.

9. The battery pack of claim 1, wherein the mounting nut has a height lower than a height of the first and second support members.

10. A battery pack, comprising:
- a plurality of battery modules, each battery module having a plurality of battery cells;
- a lower plate on which the plurality of battery modules are placed;
- a support member coupled to the lower plate to support the plurality of battery modules;
- a mounting nut coupled to the lower plate and coupled to the support member; and at least one bolt securing one battery module of the plurality of battery modules to the mounting nut,
- wherein the support member includes at least one vertically extending support beam, the support beam being located between and in contact with two adjacent battery modules of the plurality of battery modules,
- wherein the support beam includes at least one protrusion and at least one groove having a [' shape in opposed surfaces of the support beam,
- wherein a first battery module of the two adjacent battery modules includes a protrusion corresponding to the at least one groove of the support beam, and
- wherein a second battery module of the two adjacent battery modules includes a groove corresponding to the at least one protrusion of the support beam.

11. The battery pack of claim 10, wherein the at least one vertically extending support beam includes a plurality of spaced apart vertically extending support beams.

12. The battery pack of claim 10, wherein the at least one protrusion includes a plurality of first protrusions, and
- wherein the at least one groove includes a plurality of first grooves.

* * * * *